US011360248B2

(12) United States Patent
Sharma et al.

(10) Patent No.: US 11,360,248 B2
(45) Date of Patent: Jun. 14, 2022

(54) OPTICAL CAMOUFLAGE FILTER

(71) Applicant: 3M INNOVATIVE PROPERTIES COMPANY, St. Paul, MN (US)

(72) Inventors: Neeraj Sharma, Lake Elmo, MN (US); Guanglei Du, Painted Post, NY (US); Matthew E. Sousa, Rosemount, MN (US); Jeremy O. Swanson, Woodbury, MN (US); Jung-Sheng Wu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 123 days.

(21) Appl. No.: 16/630,534

(22) PCT Filed: Jul. 25, 2018

(86) PCT No.: PCT/IB2018/055567
§ 371 (c)(1),
(2) Date: Jan. 13, 2020

(87) PCT Pub. No.: WO2019/021222
PCT Pub. Date: Jan. 31, 2019

(65) Prior Publication Data
US 2021/0080632 A1 Mar. 18, 2021

Related U.S. Application Data

(60) Provisional application No. 62/537,381, filed on Jul. 26, 2017.

(51) Int. Cl.
*G02B 5/28* (2006.01)
*G02B 5/20* (2006.01)
(Continued)

(52) U.S. Cl.
CPC ........... *G02B 5/208* (2013.01); *G02B 5/0236* (2013.01); *G02B 5/26* (2013.01)

(58) Field of Classification Search
CPC ........ G02B 5/208; G02B 5/0236; G02B 5/26; G02B 5/0294; G02B 5/0242; G02B 5/02;
(Continued)

(56) References Cited

U.S. PATENT DOCUMENTS

2006/0003239 A1  1/2006 Cooper
2008/0090063 A1* 4/2008 Inokuma .............. G02B 5/0268
                                                          428/220
(Continued)

FOREIGN PATENT DOCUMENTS

JP      2013-065052     4/2013
WO   WO 2017-110939    6/2017

OTHER PUBLICATIONS

Examiner provided machine translation of Ishido et al., WO 2017/110939 A1 (Year: 2017).*
(Continued)

*Primary Examiner* — Balram T Parbadia
(74) *Attorney, Agent, or Firm* — Michael J. Stern; Daniel J. Iden

(57) ABSTRACT

Systems including one or both of a light emitter or a light receiver and an optical filter adjacent one or both of the light emitter or the light receive are described. The optical filter includes a wavelength selective scattering layer that scatters near-infrared light less than visible light. The wavelength selective scattering layer includes a plurality of particles. The plurality of particles have an imaginary refractive index less than 10.

10 Claims, 10 Drawing Sheets

(51) Int. Cl.
*G02B 5/02* (2006.01)
*G02B 5/26* (2006.01)

(58) Field of Classification Search
CPC ... G02B 5/20; G02B 1/11; G02B 5/22; G02B 5/28
See application file for complete search history.

(56) References Cited

U.S. PATENT DOCUMENTS

| | | |
|---|---|---|
| 2012/0038990 A1 | 2/2012 | Hao |
| 2015/0192717 A1 | 7/2015 | Katagiri |
| 2016/0195651 A1 | 7/2016 | Yoshioka |
| 2016/0231585 A1* | 8/2016 | Bauco .................... G02B 6/001 |
| 2017/0031172 A1* | 2/2017 | Lofftus .................. G02B 27/48 |
| 2017/0123122 A1 | 5/2017 | Ballif |
| 2017/0318239 A1* | 11/2017 | Miyasaka .............. G02B 5/281 |
| 2018/0059482 A1* | 3/2018 | Li ............................ F21V 3/10 |

OTHER PUBLICATIONS

Liu. "The optical functions of metal phthalocyanines", J. Phys. D.Appl. Phys, 2004, vol. 37, pp. 678-688.

Huang, Spectroscopy and optical properties of novel metal(II)-azo complex films in blue-violet light region. Chin. Phys. Lett, 2003, vol. 20, No. 12, pp. 2259-2261.

International Search report for PCT International Application No. PCT/IB2018/055567 dated Nov. 21, 2018, 3 pages.

\* cited by examiner

OPTICAL CAMOUFLAGE FILTER

BACKGROUND

Light may get reflected from surfaces in different ways, for example, as a specular reflection or as a diffusive reflection. In opaque materials, specular reflection may occur on an uppermost surface layer of the material, for example, at an air/material interface, and the reflection may carry a full spectrum of incident light. Specular reflection may manifest as shininess or gloss, which may account for less than 4% of the total reflected light. In contrast, diffusive reflection may occur under a top surface of the material, and may carry selected wavelengths or color. For example, color may be seen in the diffuse reflection of a non-metallic object. Both kinds of reflection may be observed, for example, at hybrid surfaces, for example, surfaces including a paint coat covered by a clear top coat. Thus, specular reflection may occur at the air/top coat interface, while diffuse reflection may occur at the top coat/paint coat interface.

Optical filters are employed in a wide variety of applications such as optical communication systems, sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

SUMMARY

In one aspect, the present disclosure relates to a system. The system includes one or both of a light emitter or a light receiver and an optical filter adjacent one or both of the light emitter or the light receiver. The optical filter includes a wavelength selective scattering layer. The wavelength selective scattering layer includes a plurality of particles. The wavelength selective scattering layer has a near-infrared scattering ratio of less than about 0.9, the near infrared scattering ratio being an average near-infrared scattering to an average visible haze. The wavelength selective scattering layer also has a visible reflective haze ratio of greater than about 0.1, the visible reflective haze ratio being a ratio of an average visible diffusive reflectance to an average visible total reflectance. The plurality of particles have an imaginary refractive index less than 10.

In another aspect, the present disclosure relates to an article. The article includes an optical filter. The optical filter includes a wavelength selective scattering layer. The wavelength selective scattering layer includes a plurality of particles. The wavelength selective scattering layer has a near-infrared scattering ratio of less than about 0.9, the near infrared scattering ratio being an average near-infrared scattering to an average visible haze. The wavelength selective scattering layer also has a visible reflective haze ratio of greater than about 0.1, the visible reflective haze ratio being a ratio of an average visible diffusive reflectance to an average visible total reflectance. The plurality of particles have an imaginary refractive index less than 10.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

Figure 1A:
FIGS. 1A-1E are lateral cross-sectional views of example articles including optical filters.

It should be understood that features of certain Figures of this disclosure may not necessarily be drawn to scale, and that the Figures present non-exclusive examples of the techniques disclosed herein.

DETAILED DESCRIPTION

In this disclosure, "visible" refers to wavelengths in a range between about 400 nm and about 700 nm, and "near-infrared" refers to wavelengths in a range between about 700 nm and about 2000 nm, for example, wavelengths in a range between about 800 nm and about 1200 nm. ULI (ultra-low index) films refers to optical films including a binder, a plurality of particles, and a plurality of interconnected voids, as described in U.S. Patent Application Publication No. 2012/0038990, incorporated herein in its entirety by reference.

Ambient sources of electromagnetic radiation may interfere with receivers configured to receive light of particular wavelengths or from particular sources, or with light emitters configured to emit light of particular wavelengths. For example, visible wavelengths may interfere with receiving, sensing, or transmitting near-infrared wavelengths, for example, by increasing noise in a light receiver or in a light emitter. Sources of electromagnetic radiation may also be unintentionally revealed. For example, while light emitted by a light emitter configured to emit only near-infrared wavelengths may not be visibly perceptible, the device or the structure responsible for emitting the light, for example, a housing of the light emitter, may be visibly perceptible. Masking, concealing or otherwise camouflaging the light emitter may present challenges because the camouflage techniques may undesirably result in blocking, interference, or reduction in the transmission of desired near-infrared wavelengths. Optical filters according to examples of this disclosure may be used to prevent unwanted optical interference from visible wavelengths, or to camouflage sources of electromagnetic radiation from visible perception, while at least partially allowing desired near-infrared wavelengths to be transmitted by a light emitter or received by a light receiver, or while allowing transmission of near-infrared wavelengths with relatively high clarity.

For example, a light receiver operating to receive or sense near-infrared wavelengths may be shielded from visible wavelengths, preventing interference with the receiving or sensing of near-infrared wavelengths that may be caused by visible wavelengths. A light transmitter operating to transmit near-infrared wavelengths may be camouflaged against visible perception by scattering visible wavelengths. For example, the scattered visible wavelengths may conceal the presence of the light transmitter, without obstructing the transmission of near-infrared wavelengths.

The amount of specular reflection off a surface may be determined by Fresnel reflection of air interface. For an opaque surface with a clear top layer, it may be assumed that all specular reflection arises from the top air interface, and that the rest of the reflection is diffusive reflection from a bottom layer. An opaque colored material could also follow similar model, while using its refractive index to calculate Fresnel reflection on top surface and treat all other reflection is diffusive. The example optical filters may have a diffusive coating disposed on a clear substrate or a reflective film. When the diffusive coating is coated on clear substrate, it may have a higher haze to hide the items underneath. When the coating is coated on a reflector, the coating will diffuse incident light twice, by reflection. In that case, the coating may have less haze.

Thus example systems may include one or both of a light receiver and a light emitter, and an optical filter that includes a wavelength selective scattering layer that may at least partially reduce the transmission of visible wavelengths, while at least partially allowing the transmission of near-infrared wavelengths. For example, the wavelength selective scattering layer may scatter a majority of incident visible light. Example systems and articles according to the present disclosure may include example optical articles including example wavelength selective scattering layers that transmit near-infrared light with relatively high clarity while reducing the transmission of visible wavelengths, for example, by selectively scattering or reflecting visible wavelengths.

FIGS. 1A-1E are lateral cross-sectional views of example articles including optical filters. FIG. 1A shows a lateral cross-sectional view of example article 10a. Article 10a includes a substrate 12 and a wavelength selective scattering layer 14. The substrate 12 may include glass, polymer, metal, or any other suitable rigid, semi-rigid, or soft maters, and combinations thereof. While the substrate 12 is shown as a layer in the example article 10a of FIG. 1A, in examples, substrate 12 may assume any suitable three dimensional shape that may have a flat, a substantially flat, or a textured surface. In examples, substrate 12 may include a housing, a screen, or a surface of a device, for example, an electronic device.

The wavelength selective scattering layer 14 selective scatters visible light and transmits near-infrared light. In examples, the wavelength selective scattering layer may have a near-infrared scattering ratio of less than about 0.9, less than about 0.8, less than about 0.7, less than about 0.6, or less than about 0.5. The near-infrared scattering ratio is a ratio of an average near-infrared scattering to an average visible scattering. In examples, the wavelength selective scattering layer 14 may have a visible reflective haze ratio of greater than about 0.5, or greater than about 0.7, or greater than about 0.9. The visible reflective haze ratio is a ratio of an average visible diffusive reflectance to an average visible total reflectance. In examples, the wavelength selective scattering layer 14 may transmit less than about 50% of incident visible light. In examples, the wavelength selective scattering layer 14 may transmit greater than about 50% of incident near-infrared light. In examples, the wavelength selective scattering layer 14 may transmit less than about 50% of incident visible light, and transmit greater than about 50% of incident near-infrared light. In examples, the wavelength selective scattering layer 14 may scatter greater than about 50% of incident visible light. For example, the wavelength selective scattering layer 14 may transmit less than about 50% of incident visible light by scattering more than about 50% of incident visible light. In examples, the wavelength selective layer 14 may scatter greater than about 50% of incident visible light as white light. In some embodiments, the wavelength selective scattering layer has a visible reflective haze ratio of greater than about 0.1. In some embodiments, the visible reflective haze ratio is greater than about 0.3.

The wavelength selective scattering layer 14 may include a medium and a plurality of particles with respective predetermined refractive indices. The plurality of particles may include $TiO_2$, inorganic pigments, or organic pigments. The medium may include a polymer, a coated polymer, a thermoplastic polymer, or an adhesive. In examples, the wavelength selective scattering layer 14 may include a beaded diffuser layer. For example, the wavelength selective scattering layer 14 may include a medium and beads dispersed in the medium. The medium of the beaded diffuser layer may include glass, polymer, or any other suitable optical medium, or combinations thereof. The beads may include silica, glass, polymeric, organic, inorganic, metal oxide, polystyrene, or other suitable scattering materials, or combinations thereof. The diffuser layer may include pores including a gas such as air. In examples, the pores including gas may be encapsulated in beads. The wavelength selective scattering layer may include a printable ink. The wavelength selective scattering layer may include a dye.

The wavelength selective scattering layer 14 may include an optical medium have a first refractive index. The optical medium may include a plurality of particles. The plurality of particles may have an imaginary refractive index component. The imaginary refractive index component may be less than 10. The imaginary refractive index may be less than $10^{-7}$. The imaginary refractive index may be between 10 and $10^{-1}$. The plurality of particles may have a second refractive index such that an absolute difference between the first refractive index and the second refractive index is less than about 0.1. In examples, the plurality of particles may have an average particle size of less than about 5 µm, and the absolute difference between the first and second refractive indices may be less than about 0.1. In examples, the plurality of particles may have an average particle size of less than about 1 µm, and the absolute difference between the first and second refractive indices may be less than about 0.2. In examples, the plurality of particles may have an average particle size of less than about 0.5 µm, and the absolute difference between the first and second refractive indices may be less than about 0.4. In examples, the plurality of particles may have an average particle size of less than about 0.3 µm, and the absolute difference between the first and second refractive indices may be less than about 0.6. In examples, the plurality of particles may have an average particle size of less than about 0.2 µm, and the absolute difference between the first and second refractive indices may be less than about 1.8.

The near-infrared scattering ratio of the wavelength selective scattering layer 14 may be less than 0.2. The near-infrared scattering ratio of the wavelength selective scattering layer 14 may be less than 0.4. The near-infrared scattering ratio of the wavelength selective scattering layer 14 may be less than 0.6. The near-infrared scattering ratio of the wavelength selective scattering layer 14 may be less than 0.8. In examples, the near-infrared scattering ratio of the wavelength selective scattering layer 14 may be less than 0.7, or may be less than 0.5. In examples, the region under respective lines 82, 84, 86, 88 or any other region may be bounded by a lower particle size bound. For example, the region may only include particle sizes above 10 nm, or 30 nm, or 50 nm, or particle sizes greater than particle sizes at which Rayleigh scattering may manifest or predominate.

Figure 5:
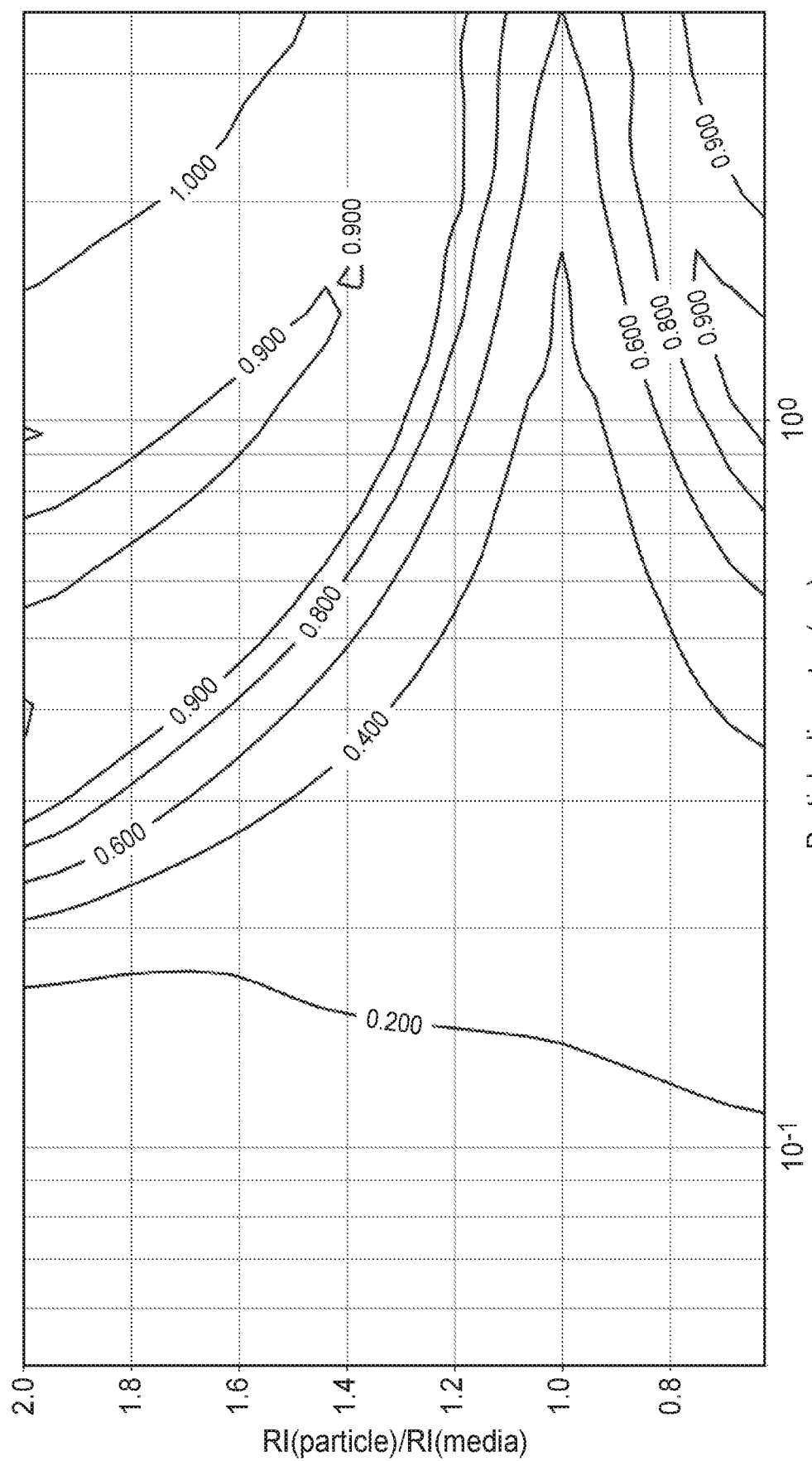
FIG. 5 is a chart of near-infrared scattering ratio as a function of particle diameter and refractive index difference for exemplary wavelength selective scattering layers including an optical medium and a plurality of particles with an imaginary component of their refractive index being smaller than 10.
Figure 6:
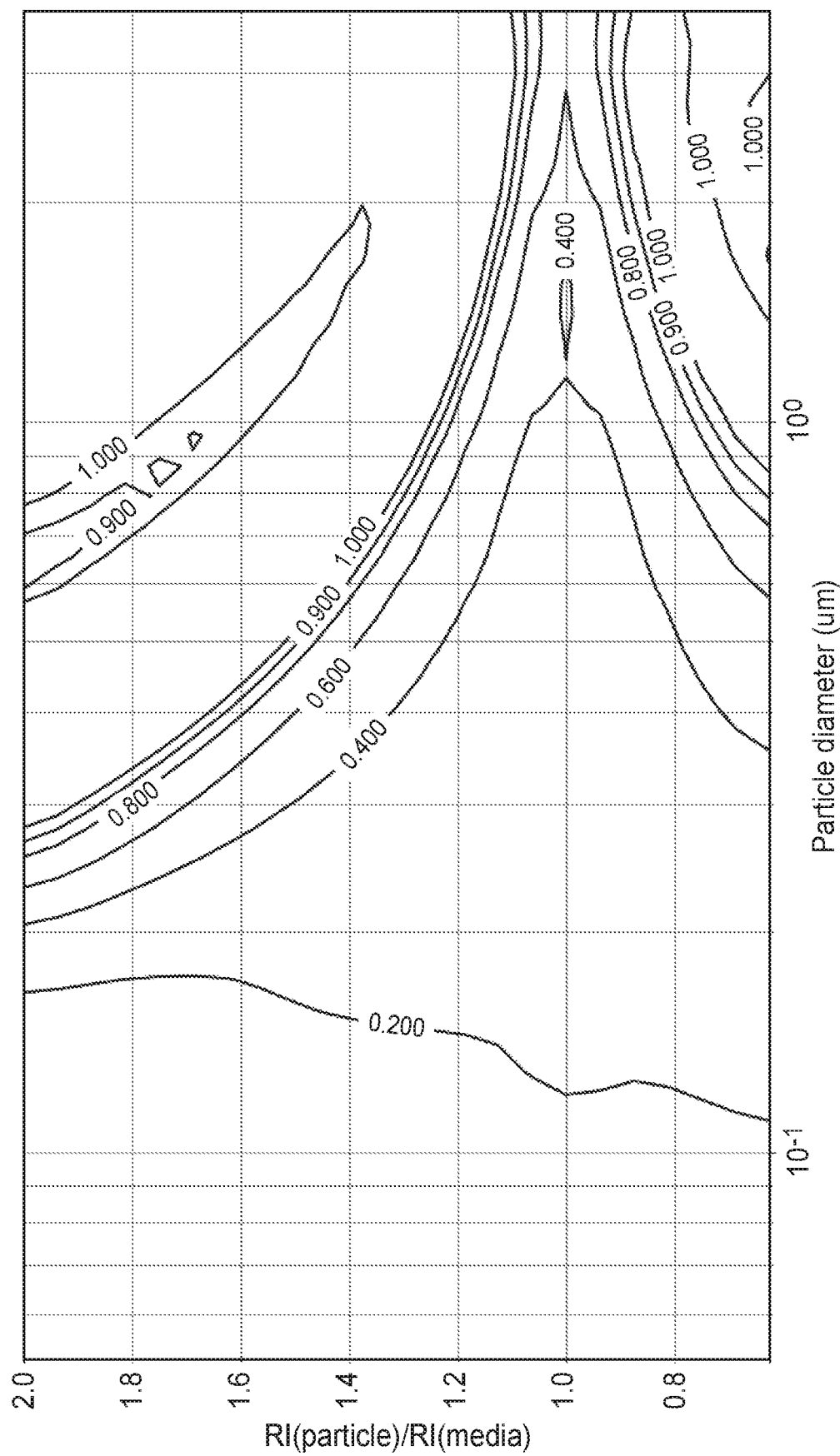
FIG. 6 is a chart of near-infrared scattering ratio as a function of particle diameter and refractive index difference for exemplary wavelength selective scattering layers including an optical medium and a plurality of particles with an imaginary component of their refractive index being smaller than $10^{-7}$.
Figure 9:
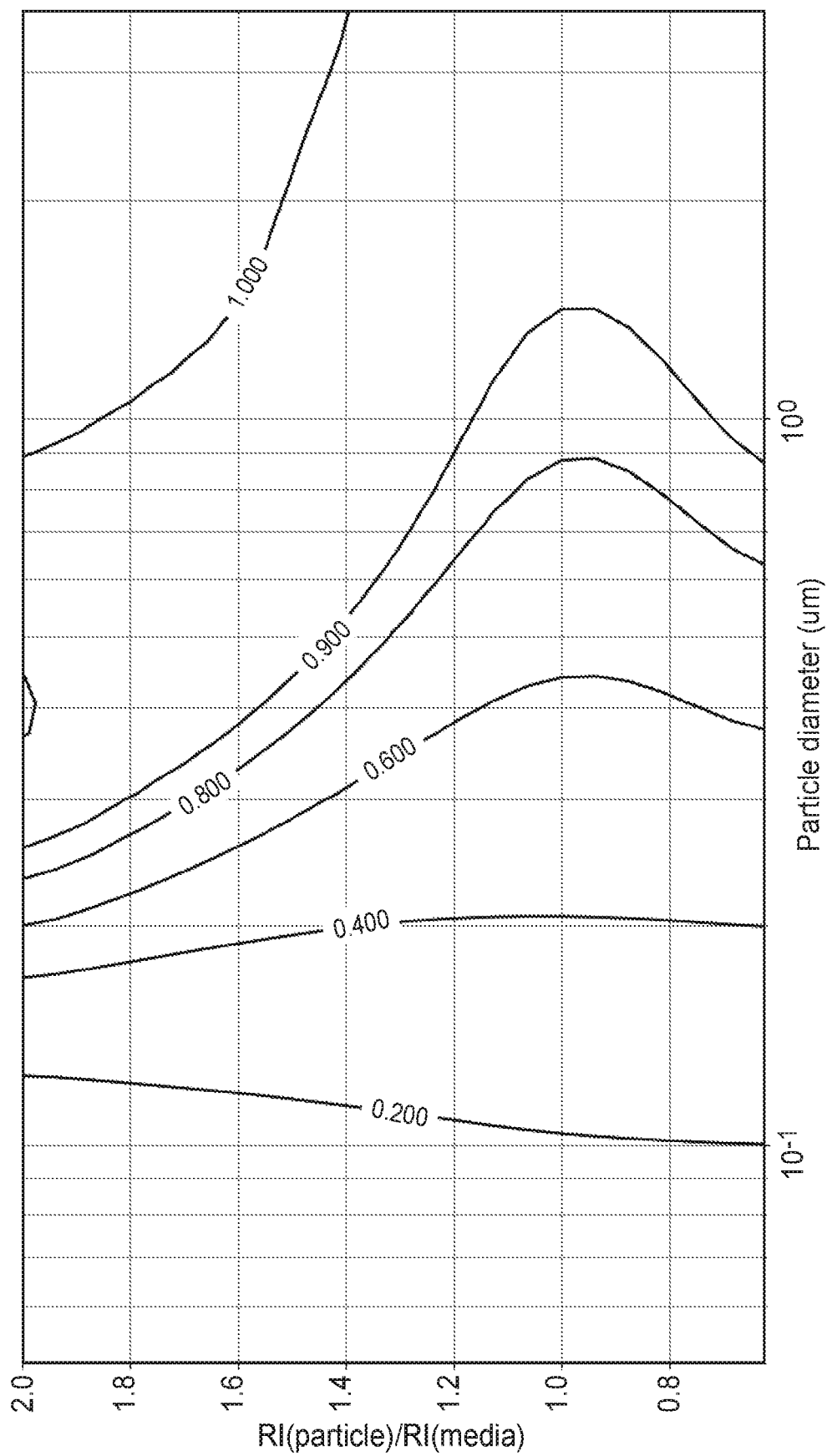
FIG. 9 is a chart of near-infrared scattering ratio as a function of particle diameter and refractive index difference for exemplary wavelength selective scattering layers including an optical medium and a plurality of particles with an imaginary component of their refractive index being between 10 and 0.1.

In some embodiments, the wavelength selective scattering layer may include an optical medium having a first refractive index and a plurality of particles having an average particle size and a second refractive index, where the average particle size, the first refractive index, and the second refractive index are selected from a region under line [0.900] in FIG. 5. In some embodiments, the wavelength selective scattering layer may include an optical medium having a first refractive index and a plurality of particles having an average particle size and a second refractive index, where the average particle size, the first refractive index, and the second refractive index are selected from a region under line [0.600] in FIG. 5. In some embodiments, the wavelength selective scattering layer may include an optical medium having a first refractive index and a plurality of particles having an average particle size and a second refractive index, where the average particle size, the first refractive index, and the second refractive index are selected from a region under line [0.400] in FIG. 5. In some embodiments, the wavelength selective scattering layer may include an optical medium having a first refractive index and a plurality of particles having an average particle size and a second refractive index, where the average particle size, the first refractive index, and the second refractive index are selected from a region under line [0.900] in FIG. 6. In some embodiments, the wavelength selective scattering layer may include an optical medium having a first refractive index and a plurality of particles having an average particle size and a second refractive index, where the average particle size, the first refractive index, and the second refractive index are selected from a region under line [0.600] in FIG. 6. In some embodiments, the wavelength selective scattering layer may include an optical medium having a first refractive index and a plurality of particles having an average particle size and a second refractive index, where the average particle size, the first refractive index, and the second refractive index are selected from a region under line [0.400] in FIG. 6. In some embodiments, the wavelength selective scattering layer may include an optical medium having a first refractive index and a plurality of particles having an average particle size and a second refractive index, where the average particle size, the first refractive index, and the second refractive index are selected from a region under line [0.900] in FIG. 9. In some embodiments, the wavelength selective scattering layer may include an optical medium having a first refractive index and a plurality of particles having an average particle size and a second refractive index, where the average particle size, the first refractive index, and the second refractive index are selected from a region under line [0.600] in FIG. 9. In some embodiments, the wavelength selective scattering layer may include an optical medium having a first refractive index and a plurality of particles having an average particle size and a second refractive index, where the average particle size, the first refractive index, and the second refractive index are selected from a region under line [0.400] in FIG. 9.

In examples, the wavelength selective scattering layer 14 may have a total visible reflectance of less than 50%, of at least 50%, or at least 60%, or at least 70%. In examples, the total visible reflectance may be less than 50%, and the wavelength selective scattering layer 14 may conceal objects by visible haze. In examples, the total visible reflectance may be greater than 50%, and the wavelength selective scattering layer 14 may conceal objects by a combination of visible reflection and visible haze. In examples, the wavelength selective scattering layer 14 may have an average near-infrared scattering of less than 60%, or less than 40%. In examples, the wavelength selective scattering layer may have an average visible scattering of greater than 10%, or greater than 25%, or greater than 58%. In examples, a difference between the % total visible reflectance and the % diffuse visible reflectance of the wavelength selective scattering layer 14 may be less than 20. In examples, the wavelength selective scattering layer may have an average near-infrared scattering of less than 40%, and an average visible scattering of greater than 58%, and the difference between the % total visible reflectance and the % diffuse visible reflectance may be less than 18.

In some embodiments, the wavelength selective scattering layer may have an average near-infrared transmission scattering of less than about 0.5 in a range from 800 nm to 1000 nm. In some embodiments, the average near-infrared scattering may be less than about 0.2. In some embodiments, the average near-infrared scattering may be less than about 0.1. In some embodiments, the average near-infrared transmission scattering may be less than about 0.05. In some embodiments, the average near-infrared transmission scattering may be less than about 0.02.

In examples, the wavelength selective scattering layer 14 may have a visible haze of at least 15%, or at least 25%, or at least 35%, or at least 50%. In examples, the optical filter 10a may include surface optical microstructures, such as microreplicated surface structures.

In examples, the wavelength selective scattering layer 14 may include ULI layer including a binder, a plurality of particles, and a plurality of interconnected voids. A volume fraction of the plurality of interconnected voids in the optical filter may not be less than about 20%. A weight ratio of the binder to the plurality of the particles may not be less than about 1:2.

The optical filter may include a protective layer. The optical filter may include a sealant layer.

Figure 1B:

FIG. 1B shows a lateral cross-sectional view of example article 10b. Article 10b may include the substrate 12, the wavelength selective scattering layer 14, and a reflective layer 16. While reflective layer 16 is shown between the wavelength selective scattering layer 14 and the substrate 12 in article 10b, in examples, article 10b may not include the substrate 12, and the wavelength selective scattering layer may be disposed on the reflective layer 16. In examples, substrate 12 may include the reflective layer 16, for example, at a major surface or within an interior of substrate 12. In examples, the reflective layer 16 may be disposed below the substrate 12. In examples, the reflective layer 16 may be disposed above the substrate 12. In examples, the reflective layer 16 may be perforated. In examples, article 10b may reflect less than 50% of visible light, and transmit more than 50% of near-infrared light. In examples, reflective layer 16 may be wavelength selective, for example, reflecting only selected wavelengths. Reflective layer 16 may include a multilayer optical film, a dichroic reflector, an interference film, an inorganic multilayer stack, a metal dielectric stack, a polished substrate, a mirror, a reflective polarizer, or a reflective surface such as a reflective metal or glass surface. In examples, article 10b may include a dye layer (not shown) between the reflective layer and the wavelength selective scattering layer 14, or above the wavelength selective scattering layer 14, or positioned adjacent any layer in article 10b. The dye layer may include a spectrally selective dye, that may be transmissive or clear in near-infrared, and neutral in visible, such that it reduces the visible reflection of the reflective layer 16. In examples, the dye layer may have at least 30%, 50%, 70%, or 90% absorption. In examples, the dye layer could be colored, so that it has a visible color, while remaining transmissive in near-infrared.

Figure 1C:

FIG. 1C shows a lateral cross-sectional view of example article 10c. Article 10c may include the substrate 12 and the wavelength selective scattering layer 14. Article 10c may optionally include one or more of the reflective layer 16, an ink receptive layer 18, a printed pattern layer 22, and a protective layer 24, as shown in FIG. 1C. While FIG. 1C shows a particular arrangement for layers in article 10c, the respective layers may be rearranged in any suitable configuration. For example, substrate 12 may be omitted when the reflective layer 16 is present. The protective layer 24 may include a sealant layer. In examples, the inked pattern layer 22 includes a printed pattern of ink or pigment that may be deposited on the ink receptive layer 18. In examples, the ink receptive layer may be omitted, and the inked pattern layer 22 may be deposited on the wavelength selective scattering layer 14. In examples, the protective layer 24 may be disposed between the inked pattern layer 22 and the wavelength selective scattering layer 14. In examples, two protective layers 24 may be disposed, one above the inked pattern layer 22, and another adjacent the wavelength selective scattering layer 14.

Figure 1D:

FIG. 1D shows a lateral cross-sectional view of example article 10d. Article 10d may include the substrate 12, the wavelength selective scattering layer 14, a first sealant layer 26 and a second sealant layer 28. One of both of the first sealant layer 26 and the second sealant layer 28 may include a latex coating. The respective sealant layers, may protecting the integrity of the wavelength selective scattering layer 14, for example, by preventing or reducing the intrusion of moisture or other reactants or disintegrants. The respective sealant layers may also provide structural support and physical stability to the wavelength selective scattering layer 14. For example, one or both of the first sealant layer 26 and the second sealant 28 may allow the wavelength selective scattering layer 14 to be peeled off or removed from a manufacturing substrate and then transported to and applied over a product substrate, for example, over substrate 12.

Figure 1E:
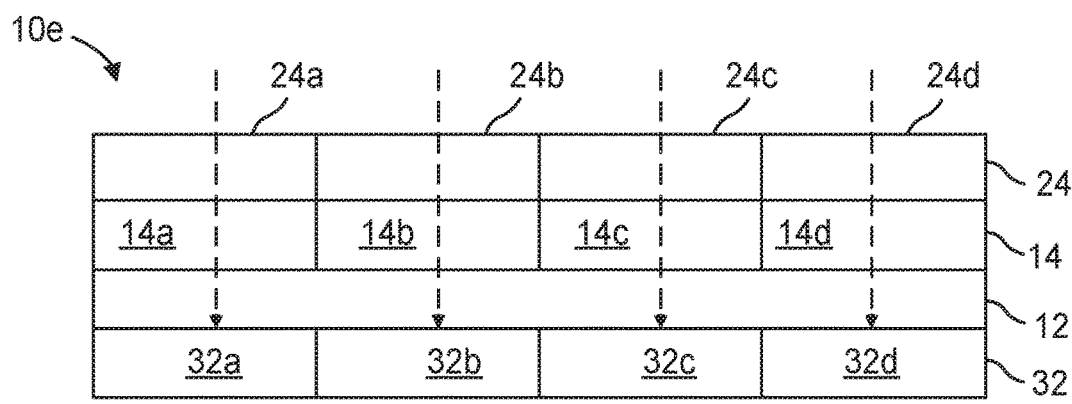

FIG. 1E shows a lateral cross-sectional view of example article 10e. Article 10e may include the substrate 12, the wavelength selective scattering layer 14 adjacent the substrate 12, and an inked pattern layer 24 deposited on the wavelength selective scattering layer 14. A sensor layer 32 including respective sensor segments 32a, 32b, 32c, and 32d may be disposed adjacent the substrate 12. In examples, the substrate 12 may be omitted, and the wavelength selective scattering layer 14 may be deposited on the sensor layer 32. In examples, the wavelength selective scattering layer 14 may include respective selective scattering segments 14a, 14b, 14c, and 14d, that may be aligned with respective sensor segments 32a, 32b, 32c, and 32d. One or more of the selective scattering segments may be omitted, so that the wavelength selective scattering layer 14 may include at least one perforation that may be aligned with at least one of the respective sensor segments. Thus different selective scattering segments may be tuned by changing the near-infrared scattering ratio, the visible haze ratio, or other optical properties that may improve the performance of the sensor segment aligned with the respective selective scattering segment. While four segments are shown in the wavelength scattering layer 14 and the sensor layer 32 of FIG. 1E, in examples, the wavelength scattering layer 14 and the sensor layer 32 may have any suitable number of segments. While sensor layer 32 is described in the example of FIG. 1E, in examples, article 10e may include light sources 32a, 32b, 32c, and 32d instead of sensor segments.

While FIGS. 1A-1E show respective articles 10a-10e as including flat layers, in various examples, articles 10a-10e may assume any suitable shape, periphery, or cross-section, and layers in articles 10a-10e may assume a regular, irregular, or compound curvature, or may assume flat or curved geometries in different regions, or otherwise conform to a contour of a substrate beneath the layers or the articles 10a-10e. For example, articles 10a-10e may assume a hemispherical or lenticular shape.

Figure 2A:
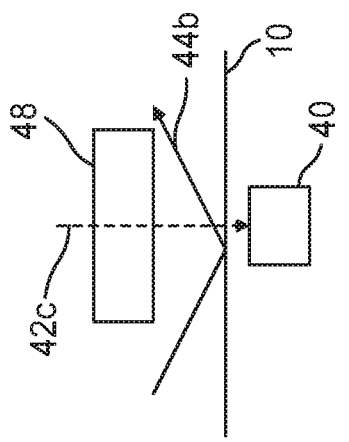
FIGS. 2A-2E are conceptual and schematic diagrams of example systems including an optical filter.

FIGS. 2A-2E are conceptual and schematic diagrams of example optical systems including an optical filter. FIG. 2A is a conceptual and schematic diagrams of an example optical system including an optical filter 10 and a light receiver 40. In examples, the light receiver 40 may include a light sensor, camera, CCD, or any other sensor configured to sense at least a predetermined wavelength region of light. For example, light receiver 40 may include a near-infrared sensor. In examples, the light receiver 40 may include an object that receives light, for example, a solar cell, or an object that at least partially absorbs incident light, for example, a solar heater or any other object that receives light. The optical filter 10 may include any of the example optical filters including a wavelength selective scattering layer, as discussed above with reference to FIGS. 1A-1E, or other example optical filters described in the disclosure. As shown in FIG. 2A, the optical filter 10 may be disposed adjacent the light receiver 40. An incident near-infrared ray 42a may include a near-infrared wavelength, and may be substantially transmitted through the optical filter 10 to the light receiver 40. An incident visible ray 44a may include a visible wavelength and may be substantially reflected or scattered by the optical filter 10, so that the light receiver 40 is at least partially shielded from the visible ray 44a, while at least partially receiving the near-infrared ray 42a. In examples, the light receiver may be substantially or completely shielded from the visible ray 44a by the optical filter 10, and may receive substantially all of near-infrared ray 42a.

Figure 2B:
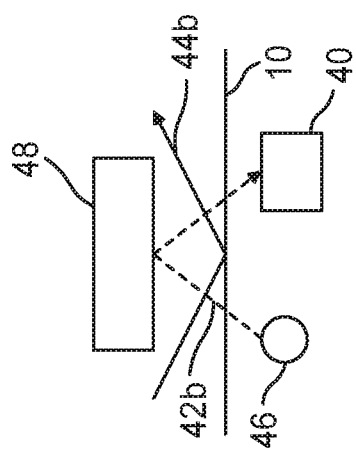

FIG. 2B is a conceptual and schematic diagrams of an example optical system including the optical filter 10, the light receiver 40, a light emitter 46, and an object 48. In examples, the light emitter 46 may include a source of any suitable wavelength of light or electromagnetic radiation, including visible, near-infrared, or ultraviolet wavelengths. In examples, the light emitter 46 may include a bulb, an incandescent light source, compact fluorescent light, LEDs, a light guide, or any natural or artificial sources of light. In examples, the light emitter 46 may not generate light, and may only reflect or transmit light generated by a light source. The optical filter 10 may be disposed between the light receiver 40 and the object 48. The light emitter may be disposed on the same side of the optical filter 10 as the light receiver 40. An near-infrared ray 42b transmitted from the light emitter 46 may include a near-infrared wavelength, and may be substantially transmitted through the optical filter 10 to the object 48. The ray 42b may be reflected back by the object 48, and the reflected ray may be modified by the optical properties of the object 48. The reflected ray 42 may be substantially transmitted through the optical filter 10 to the light receiver 40. An incident visible ray 44b may include a visible wavelength and may be substantially reflected or scattered by the optical filter 10, so that one or both of the light receiver 40 and the light emitter 46 are at least partially shielded from the visible ray 44a. In examples, the light receiver may be substantially or completely shielded from the visible ray 44b by the optical filter 10, and may receive substantially all of near-infrared ray 42b.

Figure 2C:
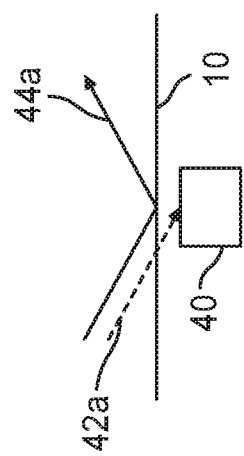

FIG. 2C is a conceptual and schematic diagrams of an example optical system including the optical filter 10, the light receiver 40, and the object 48. The optical filter 10 may be disposed between the light receiver 40 and the object 48. An incident near-infrared ray 42c may include a near-infrared wavelength, and may be substantially transmitted through the object 48 and the optical filter 10 to the light receiver 40. An incident visible ray 44c may include a visible wavelength and may be substantially reflected or scattered by the optical filter 10, so that the light receiver 40 is at least partially shielded from the visible ray 44c, while at least partially receiving the near-infrared ray 42c. In examples, the light receiver 40 may be substantially or completely shielded from the visible ray 44c by the optical filter 10, and may receive substantially all of near-infrared ray 42c.

Figure 2D:
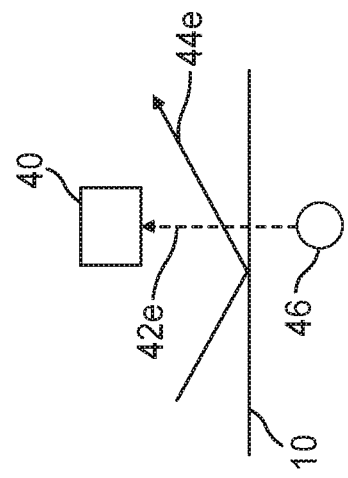

FIG. 2D is a conceptual and schematic diagrams of an example optical system including the optical filter 10 and the light receiver 40. The optical filter 10 may be disposed adjacent the light receiver 40. An incident near-infrared ray 42d may include a near-infrared wavelength, and may be substantially reflected off the optical filter 10 to the light receiver 40. An incident visible ray 44d may include a visible wavelength and may be substantially reflected or scattered by the optical filter 10, so that the light receiver 40 at least partially receives the visible ray 44d, while at least partially receiving the near-infrared ray 42d.

Figure 2E:
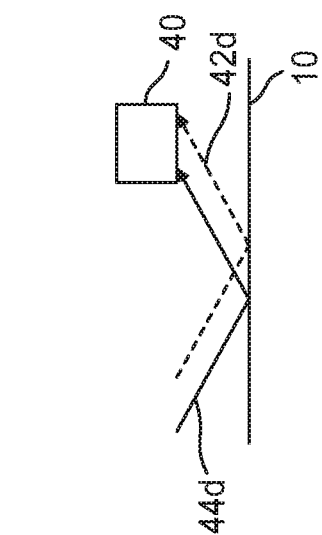

FIG. 2E is a conceptual and schematic diagrams of an example optical system including the optical filter 10, the light receiver 40, and the light emitter 46. The optical filter 10 may be disposed between the light emitter 46 and the light receiver 40. A near-infrared ray 42e transmitted from the light emitter 46 may include a near-infrared wavelength, and may be substantially transmitted through the optical filter 10 to the light receiver 40. An incident visible ray 44e may include a visible wavelength and may be substantially reflected or scattered by the optical filter 10, so that the light emitter 46 is at least partially shielded from the visible ray 44e. In examples, the light emitter 46 may be substantially or completely shielded from the visible ray 44e by the optical filter 10. While the light receiver 40 is described in the example optical system of FIG. 2E, in examples, the example optical system of FIG. 2E may not include a light receiver 40. For example, the example optical system may include the light emitter 46 and the optical filter 10, and the optical filter 10 may conceal the light emitter 46 from visible appearance.

In examples, the optical filter 10 may include at least one removable or repositionable layer, or optical filter 10 as a whole may be removable or repositionable, so that it can be removed or repositioned relative to a substrate underneath or adjacent the optical filter 10. In examples, the periphery of the optical filter 10 may extend beyond the periphery of one or both the light emitter 46 or the light receiver 40, or the area of a major surface of the optical filter 10 may be greater or smaller than a surface area of one or both of the light emitter 46 or the light receiver 40. In examples, the optical filter 10 may be configured to camouflage other components, such as electronics, circuitry, substrates, sensors, transmitters by shielding those components by the optical filter from a visual perception. In examples, more than one light emitter 46 or light receiver 40, for example, an array, could be positioned adjacent the optical filter 10. In examples, one or both of the light emitter 46 or the light receiver 40 may be relatively remote from the optical filter 10, for example, at least 1 cm away, or 10 cm away, or 1 m away or, 10 m away, or 100 m away, or 1 km away, or even further remote. While a direct path for light is shown in FIGS. 2A-2E, for example, between one or both of the light emitter 46 and the light receiver 40 and the optical filter 10, in examples, light between one or both of the light emitter 46 and the light receiver 40 and the optical filter 10 may follow indirect paths, including optically guided paths, reflected paths, or paths including optical manipulation including refraction or filtering, or paths that travel through different optical media.

Thus, in examples, the optical filter 10 may be configured to at least partially shield the light receiver 40 from visible wavelengths while substantially allowing the light receiver 40 to receive near-infrared wavelengths. In examples, the optical filter 10 may be configured to camouflage one or both of the light receiver 40 or the light emitter 46 from a visual perception, for example, by scattering visible wavelengths.

Figure 3A:
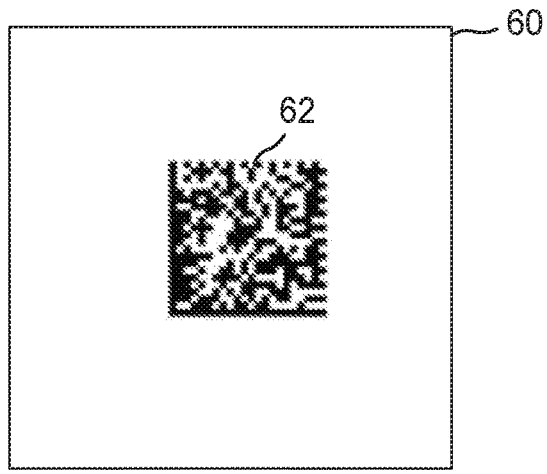
FIGS. 3A-3D are conceptual diagrams of an example system including an example optical filter and an electronic display displaying a visibly perceptible pattern and an invisible near-infrared pattern.
Figure 3B:
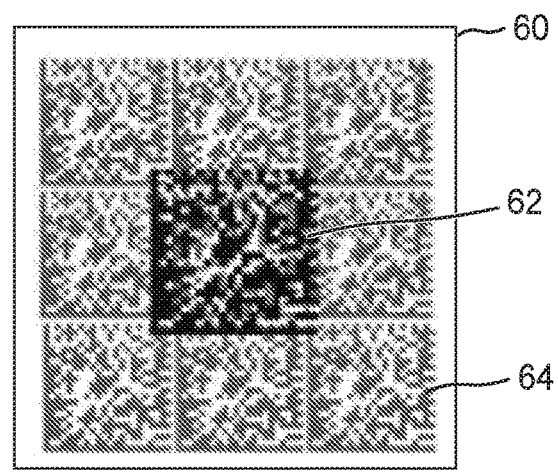
Figures 3C, 3D:
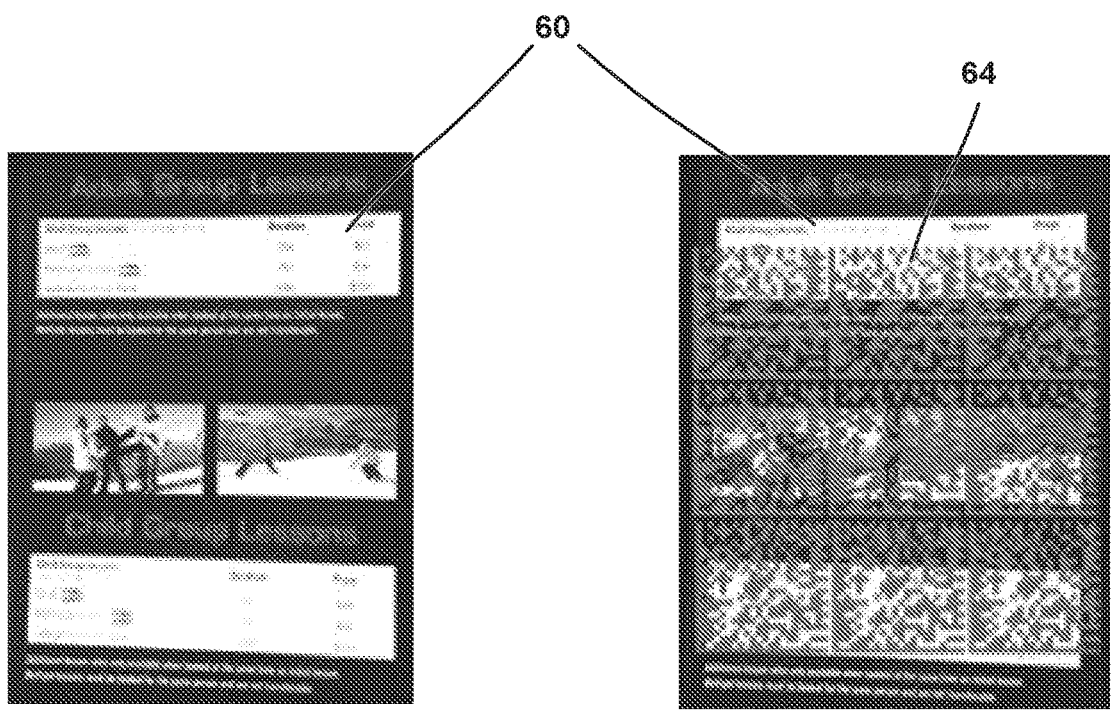

FIGS. 3A-3D are conceptual diagrams of an example system including an example optical filter and an electronic display displaying a visibly perceptible pattern and an invisible near-infrared pattern. Since imaging sensors such as charge-coupled devices (CCD) detect in the near-infrared region, it would be possible to produce a sign including a visibly reflective graphic. The sign could conceal an invisible image that is detectable by the camera. For example, the image could include a predetermined pattern that encodes a signal or information, such as a bar code, a 2D bar code, or a QR code. The physical size of QR codes may limit the amount of information they may contain. However an invisible QR code could be physically as large as the sign without cluttering or compromising the visible graphic. In an example, an electronic display 60 may be capable of simultaneously displaying visible and near-infrared patterns emitted by respective visible and near-infrared light emitters concealed behind the display 60. The electronic display 60 may be covered with an example optical filter described above with reference to FIGS. 1A-1E. For example, the electronic display 60 may simultaneously display a pattern 62 that is visible and an invisible near-infrared pattern 64, as shown in FIG. 3B. The pattern 62 may include a relatively smaller QR code or other indicia with a relatively smaller display footprint, while the pattern 64 may include a relatively larger QR code or other indicia with a relatively larger footprint. The pattern 62 may be visible as a result of reflection or scattering of visible wavelengths by the optical filter (not shown). As seen in FIG. 3A, only pattern 62 may be visibly perceived, and pattern 64 may remain invisible to visual perception, while being presented with relatively high clarity in near-infrared wavelengths. A camera capable of sensing near-infrared wavelengths may thus sense pattern 64 with sufficient resolution, for example, with a resolution sufficient to decode information that may be contained in pattern 64. In the example shown in FIG. 3C only a predetermined pattern may be visibly perceptible on display 60, while an invisible near-infrared pattern only detectable by a near-infrared camera may be simultaneously displayed on the display 60, as shown in FIG. 3D. Thus, in the respective example systems of 3A and 3B, and 3C and 3D, an example optical filter may be used to conceal or camouflage a source of a near-infrared pattern while revealing only a predetermined visible pattern. In some examples, the invisible near-infrared patterns 64 may be used to encode concealed information, while the visibly perceptible patterns 62 may be used to present visibly perceptible information, or at least information that may be encoded, but is visibly perceptible as being encoded. For example, pattern 62 may encode a first set of information, such as a website, while pattern 64 may encode a second set of information, such as a location of the display 60. In examples, the electronic display 60 may display a visible pattern, an invisible pattern, or both. In examples, the electronic display 60 may display multiple patterns. In examples, the electronic display may display static patterns or dynamic patterns. Thus, example optical filters may provide camouflage with high clarity near-infrared transmission.

Figure 4:
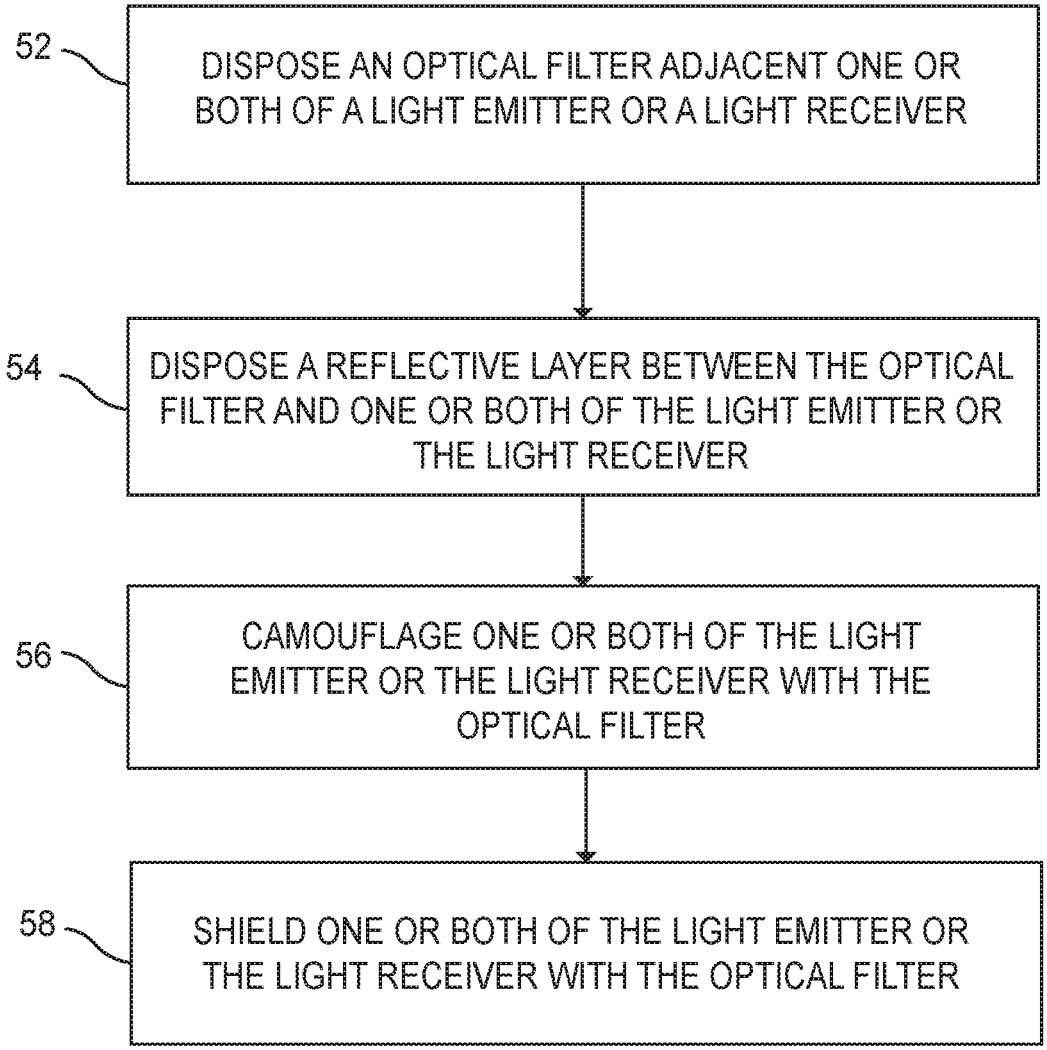
FIG. 4 is a flowchart of an example technique.

FIG. 4 is a flowchart of an example technique. The example technique may include disposing an optical filter 10 adjacent one or both of the light emitter 46 or the light receiver 40 (52). The optical filter 10 includes a wavelength selective scattering layer, as discussed above with reference to FIGS. 1A-1E and FIGS. 2A-2E. The example technique may optionally further include disposing the reflective layer 16 between the optical filter 10 and one or both of the light emitter 46 or the light receiver 40 (54). The optical filter 10 may optionally camouflage one or both of the light emitter 46 or the light receiver 40 (56). The optical filter 10 may optionally at least partially shield one or both of the light emitter or the light receiver from visible wavelengths (58).

Thus, example systems, articles, and techniques according to the present disclosure may include example optical articles including example wavelength selective scattering layers that transmit near-infrared light with relatively high clarity while reducing the transmission of visible wavelengths, for example, by selectively scattering or reflecting visible wavelengths.

Example articles and techniques according to the disclosure provide will be illustrated by the following non-limiting examples.

EXAMPLES

The commercially available materials and equipment in Table 1 were used in the preparation of samples and in conducting experiments.

TABLE 1

Commercially Available Materials and Equipment

| Designation | Description | Source |
| --- | --- | --- |
| MEK | Methyl ethyl ketone, solvent | Avantor Performance Materials, Inc Center Valley, PA |
| Dowanol ™ PM | Propylene glycol methyl ether, solvent | The Dow Chemical Company, Midland, MI |
| Tinuvin 123 | | BASF USA, Florham Park, NJ |
| 2-ethylhexyl acrylate | | Sigma-Aldrich, St. Louis, MO |
| Cellulose Acetate Propionate 504-0.2 | | Eastman Chemicals, Chicago, IL |
| Cellulose Acetate Butyrate (CAB) 381-20 | | Eastman Chemicals, Chicago, IL |
| Butyl acrylate | | BASF USA, Florham Park, NJ |
| Hydroxyethyl acrylate | | Kowa America New York, NY |
| Acrylamide | | Zibo Xinye Chemical, Zibo City, CN |
| Kronos 2160 | $TiO_2$ | Kronos Worlwide, Dallas, TX |
| Tipaque PFC105 | $TiO_2$ | Nagase & Co., Osaka, JP |
| Vazo 52 | Thermal Initiator | Dupont, Wilmington DE |
| Karenx MT PE1 | | Showa Denko America, New York, NY |
| Isocyanato ethyl methacrylate | | Showa Denko America, New York, NY |
| Irgacure 184 | Photo initiator | BASF USA, Florham Park, NJ |
| CN983 | Aliphatic polyester based urethane diacrylate oligomer | Sartomer USA, Exton, PA |
| CN9018 | | Sartomer USA, Exton, PA |
| SR415 | | Sartomer USA, Exton, PA |
| M1192 | | Miwon Commercial Co., Anyang, KR |
| Microlith ® Magenta 4500J | Organic Quinacridone pigment | BASF Color & Effects USA LLC, Florham Park, NJ |
| Microlith ® Blue 7080KJ | Organic phthalocyanine pigment | BASF Color & Effects USA LLC, Florham Park, NJ |
| Orasol Black X55 | Visible absorbing black dye | BASF Color & Effects USA LLC, Florham Park, NJ |

TABLE 1-continued

Commercially Available Materials and Equipment

| Designation | Description | Source |
|---|---|---|
| Paraloid ™ B66 | Thermoplastic acrylic resin | Dow Construction Chemicals, Midland, MI |
| UV30 TITAN L-530 | TiO2 | Sachtleben Chemie, Duisburg, DE |
| Tospearl 145 | | Momentive, Columbus, OH |
| TPO-L | photoinitiator | BASF USA, Florham Park, NJ |
| BYK 333 | surfactant | BYK additives and Instruments, Wesel, DE |
| Zetasizer Nano ZS | | Malvern Instruments Inc, Westborough, MA |

Particle and Pigment Size Measurement Methods

The particle size distribution of samples was determined as follows. The samples were diluted with 2-butanone or MEK in 1:1000 to 1:10000 by volume. The particle size distributions were measured using Zetasizer Nano ZS. The Z-Average Mean size and PDI (polydispersity index) data were reported based on dynamic light scattering. The Z-Average ($Z_{avg}$) size is the harmonic intensity averaged hydrodynamic particle diameter in the cumulants analysis as defined in ISO 13321 and ISO 22412. PDI is a dimensionless number from 0 to 1 to indicate the size distribution calculated from a simple 2-parameter fit to the correlation data as defined in the ISO standard document 13321:1996 E and ISO 22412:2008.

Particle size for the pigment dispersions was measured using Dynamic Laser light scattering (DLS). The refractive index of the Microlith Blue pigments are reported in literature (Liu et. al. J. Phys. D. Appl. Phys. 37 (2004) 678-688, as is the family of metal azo dye (Huang, et. al. Chin. Phys. Lett. 20 (2003) 2259-2261. The imaginary component of the refractive index is reported in Liu et. al. for Microlith Blue pigment. The imaginary component of the refractive index is reported in Huang et. al. for the family of metal azo dye.

Optical Property Measurement Methods

Optical properties for samples were determined. The transmittance, haze, and clarity was determined for samples using a haze meter (HAZE-GARD PLUS, BYK-Gardner). Haze is defined as a ratio of diffuse visible transmission to total visible transmission, expressed as a percentage (ratio*100). The total and diffuse visible (400-700 nm) and NIR (800-1000 nm) transmission, were measured using a spectrometer (Hunterlab Ultrascan Pro). Data between 1000-1050 nm was too noisy and was not used for calculations.

The NIR scattering at 940 nm is defined as the diffuse transmission divided by the total transmission at 940 nm.

The NIR scattering ratio at 940 nm is determined by multiplying the NIR scattering at 940 nm by 100 divided by the visible transmission haze. The visible transmission haze was measured by BYK Haze-gard plus according to ASTM D 1003 and ISO/DIS 14782.

The average NIR scattering 800-1000 nm is defined as the NIR scattering at each wavelength between 800 nm and 1000 nm and then taking the average of the NIR scattering at those wavelengths.

The NIR scattering ratio 800-1000 nm is determined by multiplying the average NIR scattering 800-1000 nm by 100 divided by the visible transmission haze. The visible transmission haze was measured by BYK HAZE-GARD PLUS according to ASTM D 1003 and ISO/DIS 14782.

The visible reflective haze ratio is a ratio of an average visible diffusive reflectance to an average visible total reflectance.

Additional optical properties determined for samples include the measurement of the specular included reflection spectrum (SPIN) and the specular excluded reflection spectrum (SPEX). These measurements were made with an Ultra Scan Pro spectrometer (Hunterlab, Reston, Va.) and are standard measurement options included with Hunterlab software. From the SPIN and SPEX measurements the diffusive reflection spectrum and glare reflection spectrum were calculated where the diffusive reflection spectrum is SPEX and the glare reflection spectrum is SPIN minus SPEX. Table 4 reports L, a, and b values based on diffuse and glare spectrums. The calculated diffusive reflection and glare reflection spectrums were used to compute X, Y, and Z values according to CIE 1931 color space followed by calculating values L, a, and b using the known Hunter Lab method. The variable L correlates to lightness with 0 being black and 100 being white. The variable a correlates to opponent colors red and green where positive values are more red and negative values are more green. The variable b correlates to opponent colors blue and yellow where negative values are more blue and positive values are more yellow.

Adhesive Synthesis Method for X1296

A base adhesive formulation was prepared as follows. 40 g of 2-ethylhexyl acrylate, 40 g of butyl acrylate, 15 g of hydroxyethyl acrylate, 5 g of Acrylamide, g of thermal initiator Vazo52, 0.08 g of Karenx MT PE1, and 60 g of MEK were charged to a reactor vessel. This vessel was sparged with Nitrogen for 5 minutes, sealed, and then placed in an agitated water bath at 60° C. for 20 hours. The generated solution polymer was then cooled, sparged with air for 10 minutes, and 0.3 g of Isocyanatyl Ethyl Methacrylate was added to the vessel. The vessel was again sealed and heated to 50° C. for 12 hours to allow for the IEM to react with pendant OH functionality on the formed acrylic polymer. Following this functionalization, 0.4 g of Irgacure-184 and 8 g of CN983 were added to the vessel and mixed for 1 hour.

Example 1

Sample optical film S01 was prepared as described below. A formulation was prepared by mixing 19.13 g g of M1192, 3.38 g of CN9018, 2.5 g of Tospearl 145, 12.5 g of SR415, 12.5 g of 42.3 wt % UV30 TITAN L-530 in IBOA, 25 g of MEK, and 0.5 g of TPO-L. The resulting formulation was coated on an ESR2 film, commercially available from 3M (St. Paul, Minn.), with a #8 Mayer bar. The resulting film was used a base film for other samples and is referred hereafter as base film. Sample S01 of example 1 was prepared with base film where the wavelength selective scattering layer included $TiO_2$ nanoparticles and silica microparticles.

Optical properties for S01 were determined based on optical properties measurement methods with the properties described in Table 2.

Example 2

Sample optical film S02 was prepared as described below. Microlith® Magenta 4500J Magenta Pigment was dispersed in MEK to create a 10 wt % dispersion. The particle size of the pigment dispersion was measured by dynamic light scattering using a Malvern Nano ZS and the $Z_{avg}$ is 140 nm. A coating solution was prepared with 1 part of the resulting dispersion and combined with 2 parts of X1296 adhesive solution. The coating solution was coated on clear PET using #20 Meyer rod. The coating was dried and a release liner was applied to the coating to protect it.

Optical properties for S01 were determined based on optical properties measurement methods with the properties described in Table 2. Additionally, the transmission spectra measured shows selective visible absorption and high IR transmission.

Example 3

Sample optical film S03 was prepared as described below. The coating solution made in Example 2 was coated on base film described in Example 1. The pigmented adhesive solution wicks in to the scattering ULI layer. The coating was dried and a release liner was applied to the coating to protect it.

Optical properties for S03 were determined based on optical properties measurement methods with the properties described in Table 2. The transmission spectra measured shows selective some visible absorption, visible scattering and IR transmission. The visible transmission haze is 16.7%. The higher visible haze comes from the increased diffuse scattering from the ULI structure described in Example 1.

Example 4

Sample optical film S04 was prepared as described below. Microlith® Magenta 4500J Magenta Pigment was dispersed in MEK to create a 10 wt % dispersion. The particle size of the pigment dispersion was measured by dynamic light scattering using a Malvern Nano ZS and the $Z_{avg}$ is 140 nm. A coating solution was prepared with 1 part of the resulting dispersion and combined with 2 parts of 40 wt % solution of Paraloid B66 in MEK. The resulting coating solution was coated on clear PET using #20 Meyer rod. The coating was dried.

Optical properties for S04 were determined based on optical properties measurement methods with the properties described in Table 2. The transmission spectra measured shows selective visible absorption and high IR transmission. The visible transmission haze is 7.9%.

Example 5

Sample optical film S04 was prepared as described below. Microlith® Blue 7080KJ Pigment was dispersed in MEK to create a 10 wt % dispersion. The particle size of the pigment dispersion was measured by dynamic light scattering using a Malvern Nano ZS and the $Z_{avg}$ is 200 nm. A coating solution was prepared with 1 part of the resulting dispersion and combined with 2 parts of 40 wt % solution of Paraloid B66 in MEK. The resulting coating solution was coated on clear PET using #20 Meyer rod. The coating was dried.

Figure 10:
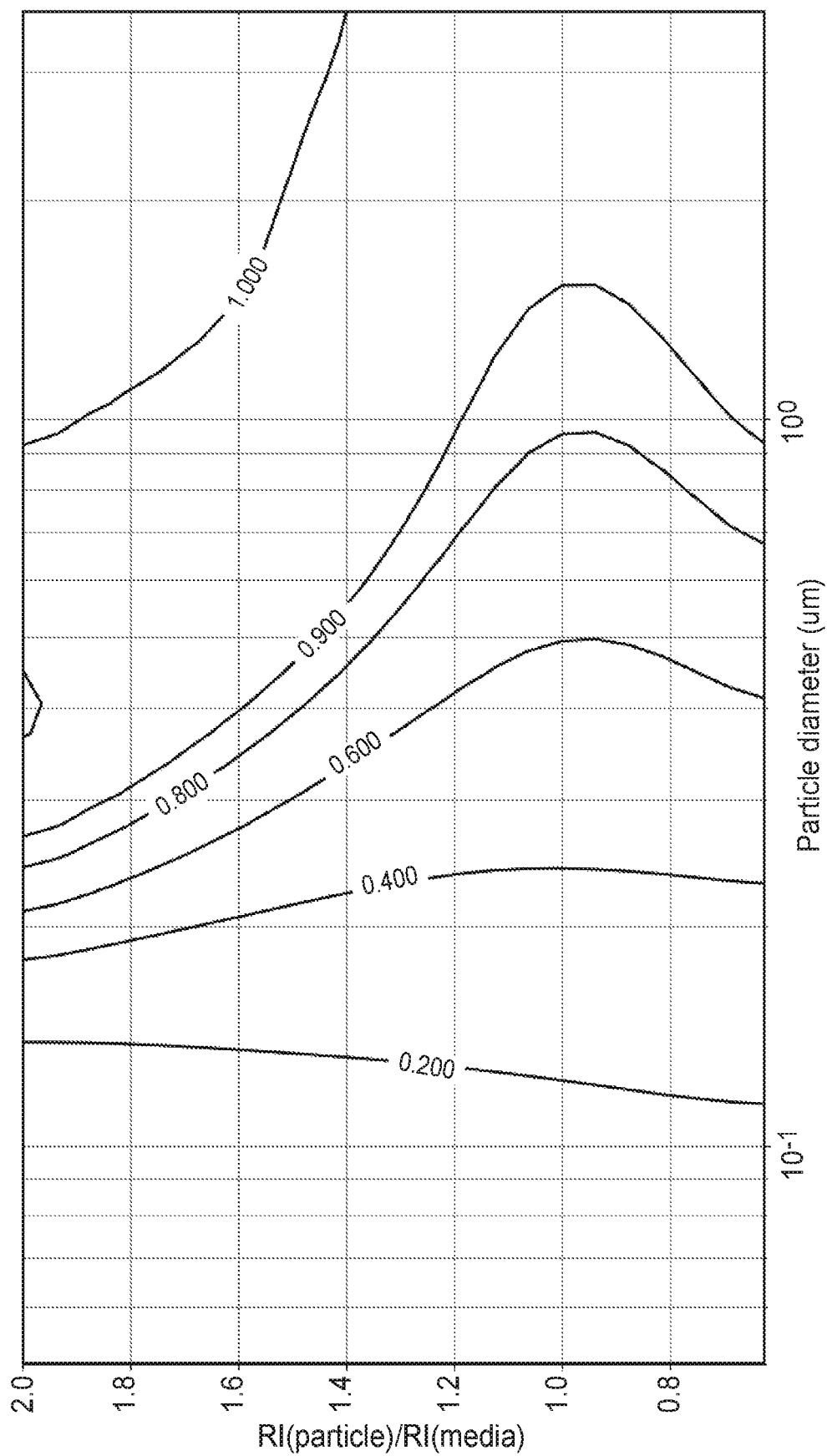
FIG. 10 is a chart of 940 nm scattering ratio as a function of particle diameter and refractive index difference for exemplary wavelength selective scattering layers including an optical medium and a plurality of particles with an imaginary component of their refractive index being between 10 and 0.1.

Optical properties for S05 were determined based on optical properties measurement methods with the properties described in Table 2. The transmission spectra measured shows strong visible absorption (green and red wavelengths) which extends up to ~800 nm and high NIR transmission. The visible transmission haze is 2.2%. The imaginary component of the refractive index for Microlith Blue pigment is greater than 0.1 and less than 1. Example 5 relates to FIG. 9 and FIG. 10 where the imaginary component of the refractive index is within the visible spectrum.

Example 6

Sample optical film S06 was prepared as described below. Orasol Black X55, Dye was dissolved in MEK at 20 wt %. One part of dye solution was mixed with 2 parts of 40 wt % solution of Paraloid B66 in MEK. The resulting coating solution was coated on clear PET using #30 Meyer rod. The coating was dried and a release liner was applied to the coating to protect it.

Figure 8:
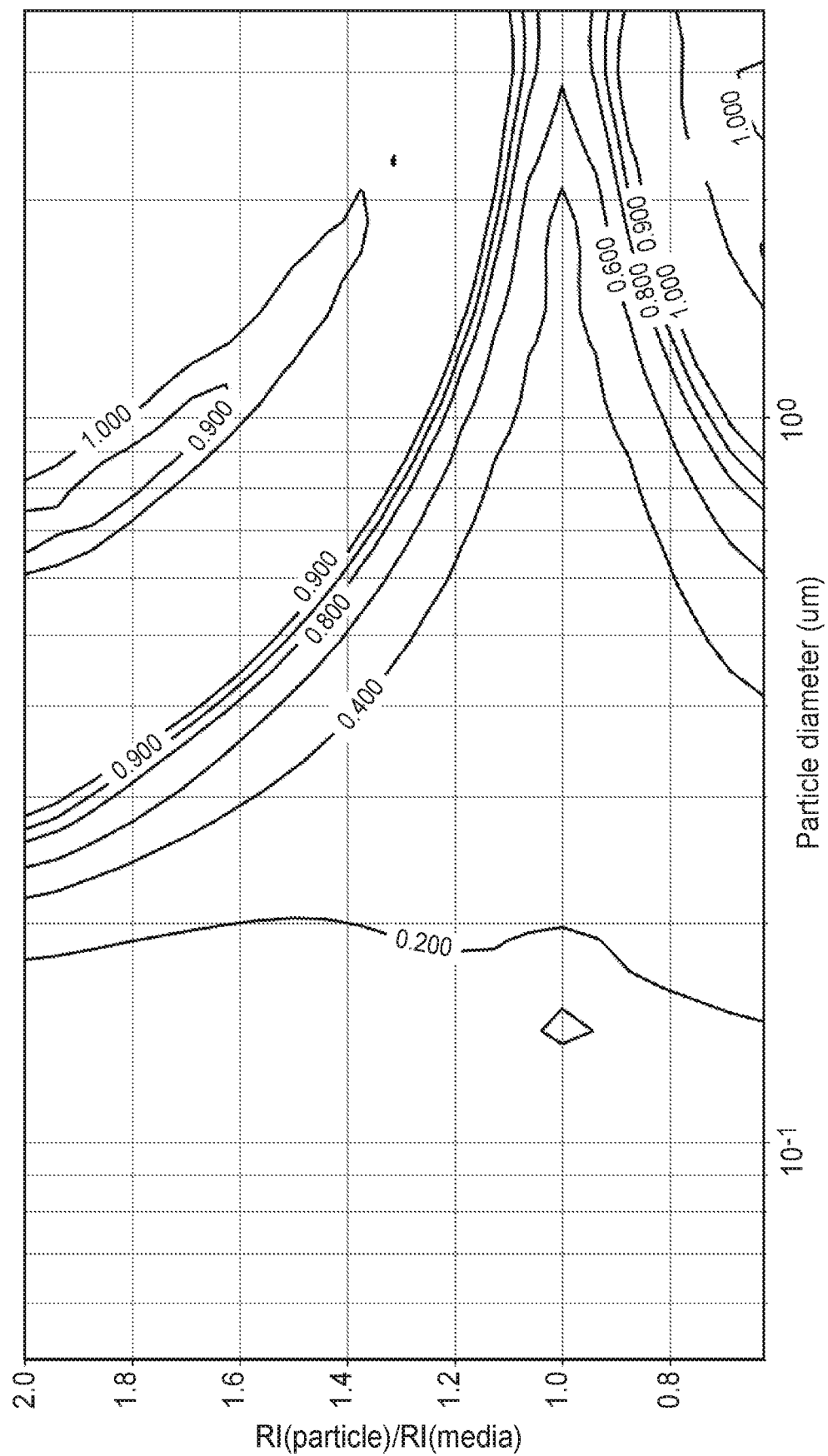
FIG. 8 is a chart of 940 nm scattering ratio as a function of particle diameter and refractive index difference for exemplary wavelength selective scattering layers including an optical medium and a plurality of particles with an imaginary component of their refractive index being smaller than 10.

Optical properties for S06 were determined based on optical properties measurement methods with the properties described in Table 2. The transmission spectra measured shows strong visible absorption across all visible wavelengths and high NIR transmission. The imaginary component of the refractive index for the metal azo dye family is less than 10. Example 6 relates to FIG. 5 and FIG. 8 where the imaginary component of the refractive index is within the visible spectrum.

Example 7

Sample optical film S07 was prepared as described below. Orasol Black X55, Dye was dissolved in MEK at 20 wt %. One part of dye solution was mixed with 2 parts of X1296 adhesive solution to create a coating solution containing Orasol black X55 dye at 6.66 wt %. The resulting coating solution was coated on film prepared in Example 1 using #20 Meyer rod. The coating was dried and a release liner was applied to the coating to protect it.

Optical properties for S06 were determined based on optical properties measurement methods with the properties described in Table 2. The transmission spectra measured shows strong visible absorption across all visible wavelengths and high NIR transmission. The imaginary component of the refractive index for the metal azo dye family is less than 10. Example 7 relates to FIG. 5 and FIG. 8 where the imaginary component of the refractive index is within the visible spectrum.

Example 8

Example 8 includes Samples S08 through 5011 where square patches of color were printed on base film from Example 1 using a Mimaki UJF-3042HG UV ink jet printer (Mimaki, Tomi, Japan). A clear vinyl 9097 (3M, St. Paul, Minn.) over laminate was applied to each of the samples. Sample optical film S08 was prepared as described above where the ink color was process black. Sample optical film S09 was prepared as described above where the ink color was yellow. Sample optical film S10 was prepared as described above where the ink color was magenta. Sample optical film S11 was prepared as described above where the ink color was cyan.

Optical properties for S08 through S11 were determined based on optical properties measurement methods with the properties described in Table 2.

Example 9

Sample optical film S12 through S18 were prepared as described below. A carrier layer was prepared by mixing 7% by weight of CAP 504-0.2 and 93% by weight of Dowanol™ PM. A scattering layer was prepared by mixing 3.5% by weight of CAB 381-20, 1.5% by weight of PFC 105 TiO2 and 95% by weight of Dowanol™ PM. A protect layer was prepared by mixing 6.99% by weight of CAB 381-20, 0.007% by weight of BYK 333, 0.007% by weight of Tinuvin 123, and 93% by weight of Dowanol™ PM. The carrier layer, the scattering layer, and the protect layer were coated concurrently using a 3 layer slide die. The carrier layer was coated at 80 grams per minute, which was approximately 0.33 um when dry. The scattering layer was varied for S12-S18 from 60 to 200 grams per minute, which is approximately 0.17 to 0.55 um dry thickness. The protect layer was coated at 230 grams per minute, which is approximately 1.0 um dry thickness. The web speed during coating was 150 feet per minute. After coating, the layers were dried in a multizone oven at 140 F and 160 F.

Figure 7:
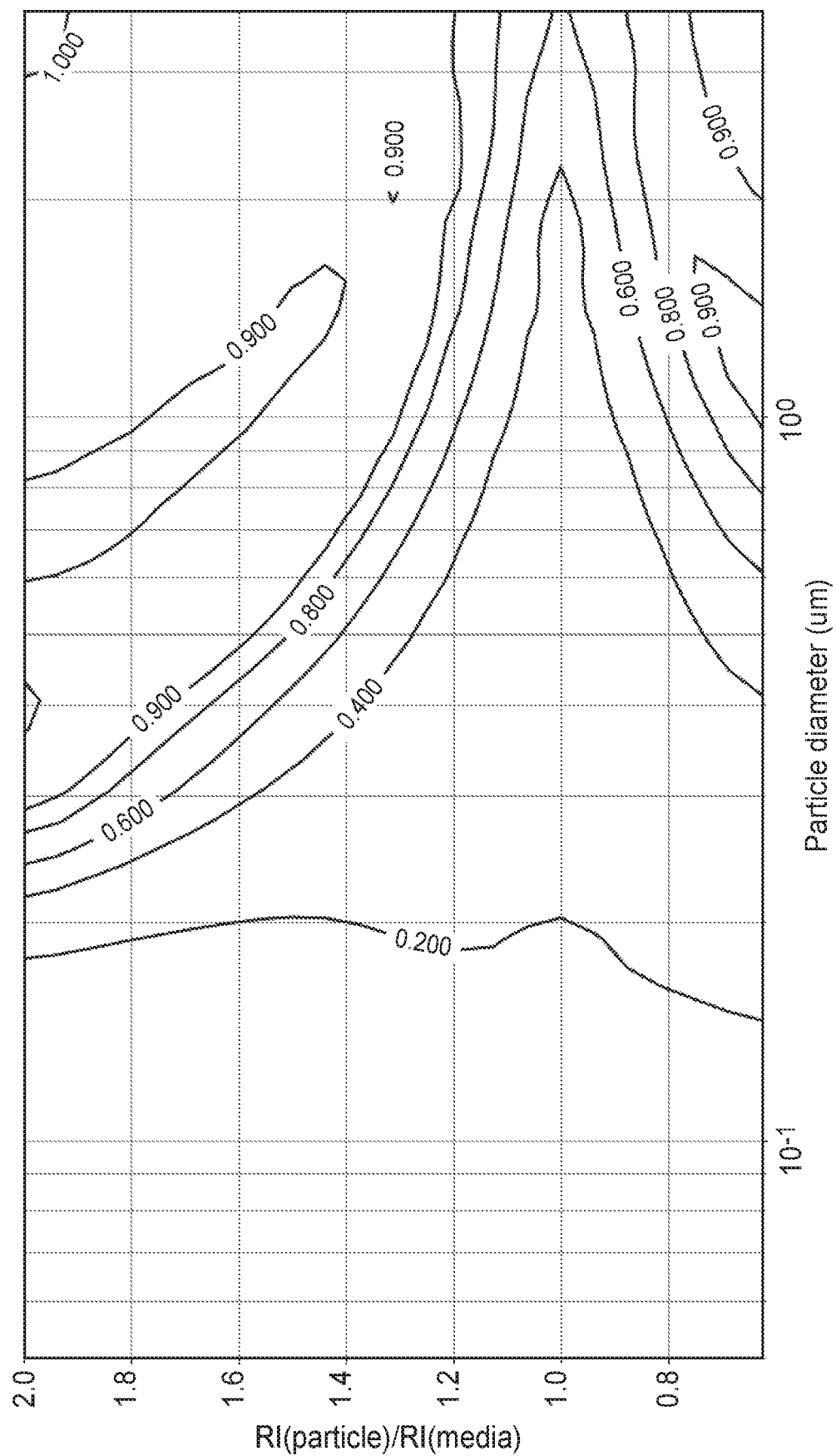
FIG. 7 is a chart of 940 nm scattering ratio as a function of particle diameter and refractive index difference for exemplary wavelength selective scattering layers including an optical medium and a plurality of particles with an imaginary component of their refractive index being smaller than $10^{-7}$.

Optical properties for S12 through S18 were determined based on optical properties measurement methods with the properties described in Table 3 and Table 4. The plurality of particles of example 9 have an imaginary component of the refractive index in the visible spectrum of less than $10^{-7}$. Example 9 relates to FIG. 6 and FIG. 7.

Example 10

Sample optical film for S19 was prepared as described below. A carrier layer was prepared by mixing 7% by weight of CAP 504-0.2 and 93% by weight of Dowanol™ PM. A scattering layer was prepared by mixing 3.5% by weight of CAB 381-20, 1.5% by weight of Kronos 2160 $TiO_2$ and 95% by weight of Dowanol™ PM. A protect layer was prepared by mixing 6.99% by weight of CAB 381-20, 0.007% by weight of BYK 333, 0.007% by weight of Tinuvin 123, and 93% by weight of Dowanol™ PM. The carrier layer, the scattering layer, and the protect layer were coated concurrently using a 3 layer slide die. The carrier layer was coated at 80 grams per minute, which was approximately 0.33 um when dry. The scattering layer was coated at 210 grams per minute, which is approximately 0.58 um dry thickness. The protect layer was coated at 230 grams per minute, which is approximately 1.0 um dry thickness. The web speed during coating was 150 feet per minute. After coating, the layers were dried in a multizone oven at 140 F and 160 F.

Optical properties for S19 were determined based on optical properties measurement methods with the properties described in Table 3 and Table 4. The plurality of particles of example 10 have an imaginary component of the refractive index in the visible spectrum of less than $10^{-7}$. Example 10 relates to FIG. 6 and FIG. 7.

TABLE 2

| | Optical Properties of Samples in Examples 1 through 8. | | | | | |
|---|---|---|---|---|---|---|
| Sample | Visible Trans. Haze (%) | Visible reflective haze ratio | NIR Scattering at 940 nm | NIR Scattering ratio at 940 nm | Average NIR scattering 800-1000 nm | NIR Scattering Ratio 800-1000 nm |
| S01 | 94.2 | 0.93 | 0.23 | 0.22 | 0.21 | 0.22 |
| S02 | 6.56 | 0.78 | 0.019 | 0.30 | 0.02 | 0.30 |
| S03 | 16.7 | 0.16 | 0.07 | 0.42 | 0.07 | 0.42 |
| S04 | 7.9 | 0.8 | 0.017 | 0.23 | 0.018 | 0.23 |
| S05 | 2.2 | 0.74 | 0.017 | 0.91 | 0.02 | 0.91 |
| S06 | | | 0.0013 | | 0.0033 | |
| S07 | | | 0.027 | | 0.027 | |
| S08 | 89.4 | 0.58 | 0.18 | 0.20 | 0.18 | 0.20 |
| S09 | 92.1 | 0.9 | 0.23 | 0.24 | 0.22 | 0.24 |
| S10 | 88.5 | 0.83 | 0.24 | 0.26 | 0.23 | 0.26 |
| S11 | 94.5 | 0.86 | 0.25 | 0.24 | 0.23 | 0.24 |

TABLE 3

| | Optical Properties of Samples in Examples 9 and 10. | | | | | | |
|---|---|---|---|---|---|---|---|
| ample | Visible Trans. Haze (%) | Specular Trans. at 940 nm | Visible Reflective Haze Ratio | Trans. Scattering at 940 nm | NIR Scattering Ratio at 940 nm | Average NIR Scattering 800-100 nm | NIR Scattering Ratio 800-1000 nm |
| 12 | 76.6 | 0.552 | 0.813 | 0.298 | 0.389 | 0.301 | 0.393 |
| 13 | 73.7 | 0.564 | 0.798 | 0.277 | 0.376 | 0.277 | 0.376 |
| 14 | 69.6 | 0.593 | 0.771 | 0.249 | 0.357 | 0.248 | 0.356 |
| 15 | 76.3 | 0.548 | 0.794 | 0.298 | 0.391 | 0.304 | 0.398 |
| 16 | 62.4 | 0.605 | 0.745 | 0.240 | 0.385 | 0.244 | 0.391 |
| 17 | 59 | 0.666 | 0.668 | 0.182 | 0.308 | 0.188 | 0.319 |
| 18 | 40.6 | 0.692 | 0.568 | 0.123 | 0.303 | 0.124 | 0.305 |
| 19 | 78.4 | 0.543 | 0.807 | 0.301 | 0.384 | 0.308 | 0.393 |

TABLE 4

Diffuse and Glare Optical Properties of Samples in Examples 9 and 10.

| ample | Diffuse Color L | Diffuse Color a | Diffuse Color b | Glare Color L | Glare Color a | Glare Color b |
|---|---|---|---|---|---|---|
| 12 | 90.140 | −1.999 | −0.126 | 43.060 | 4.493 | 0.887 |
| 13 | 89.325 | −2.112 | −0.237 | 45.292 | 4.397 | 1.187 |
| 14 | 87.810 | −2.311 | −0.437 | 49.134 | 4.311 | 1.609 |
| 15 | 89.130 | −1.390 | −0.791 | 42.177 | 4.466 | 0.729 |
| 16 | 86.292 | −1.827 | −1.232 | 49.276 | 4.450 | 1.406 |
| 17 | 81.721 | −2.209 | −2.011 | 57.930 | 3.936 | 2.254 |
| 18 | 75.368 | −2.940 | −2.662 | 68.878 | 2.947 | 3.497 |
| 19 | 89.830 | −1.359 | −1.615 | 40.728 | 4.687 | 3.421 |

The following are exemplary embodiments according to the present disclosure:

Item 1. A system comprising:
one or both of a light emitter or a light receiver; and
an optical filter adjacent one or both of the light emitter or the light receiver,
wherein the optical filter comprises a wavelength selective scattering layer,
wherein the wavelength selective scattering layer comprises a plurality of particles,
wherein the wavelength selective scattering layer has a near-infrared scattering ratio of less than about 0.9, the near-infrared scattering ratio being a ratio of an average near-infrared scattering to an average visible haze,
wherein the wavelength selective scattering layer has a visible reflective haze ratio of greater than about 0.1, the visible reflective haze ratio being a ratio of an average visible diffusive reflectance to an average visible total reflectance, and
wherein the plurality of particles have an imaginary refractive index less than 10.

Item 2. The system of item 1, wherein the wavelength selective scattering layer has a near-infrared scattering ratio of less than about 0.6.

Item 3. The system of item 1, wherein the wavelength selective scattering layer has a near-infrared scattering ratio of less than about 0.4.

Item 4. The system of any one of items 1 to 3, wherein the wavelength selective scattering layer has a visible reflective haze ratio of greater than about 0.3.

Item 5. The system of any one of items 1 to 3, wherein the wavelength selective scattering layer has a visible reflective haze ratio of greater than about 0.5.

Item 6. The system of any one of items 1 to 5, wherein the plurality of particles have an imaginary refractive index less than $10^{-7}$.

Item 7. The system of any one of items 1 to 5, wherein the plurality of particles have an imaginary refractive index between 10 and $10^{-1}$.

Item 8. The system of any one of items 1 to 7, wherein the plurality of particles include $TiO_2$, inorganic pigments, or organic pigments.

Item 9. The system of any one of items 1 to 8, wherein the wavelength selective scattering layer comprises an optical medium including a polymer, a coated polymer, a thermoplastic polymer, or an adhesive.

Item 10. The system of any one of items 1 to 9, wherein the wavelength selective scattering layer comprises a printable ink.

Item 11. The system of any one of items 1 to 9, wherein the wavelength selective scattering layer comprises dye.

Item 12. The system of any one of items 1 to 9, wherein the optical filter comprises a protective layer.

Item 13. The system of any one of items 1 to 9, wherein the optical filter comprises a sealant layer.

Item 14. The system of any one of items 1 to 11, wherein the wavelength selective scattering layer has an average near-infrared transmission scattering of less than about 0.5 with a near-infrared range from 800 nm to 1000 nm.

Item 15. The system of any one of items 1 to 11, wherein the wavelength selective scattering layer has an average near-infrared transmission scattering of less than about 0.2 with a near-infrared range from 800 nm to 1000 nm.

Item 16. The system of any one of items 1 to 11, wherein the wavelength selective scattering layer has an average near-infrared transmission scattering of less than about 0.1 with a near-infrared range from 800 nm to 1000 nm.

Item 17. The system of any one of items 1 to 11, wherein the wavelength selective scattering layer has an average near-infrared transmission scattering of less than about 0.05 with a near-infrared range from 800 nm to 1000 nm.

Item 18. The system of any one of items 1 to 11, wherein the wavelength selective scattering layer has an average near-infrared transmission scattering of less than about 0.02 with a near-infrared range from 800 nm to 1000 nm.

Item 19. An article comprising:
An optical filter,
wherein the optical filter comprises a wavelength selective scattering layer,
wherein the wavelength selective scattering layer comprises a plurality of particles,
wherein the wavelength selective scattering layer has a near-infrared scattering ratio of less than about 0.9, the near-infrared scattering ratio being a ratio of an average near-infrared scattering to an average visible haze,
wherein the wavelength selective scattering layer has a visible reflective haze ratio of greater than about 0.1, the visible reflective haze ratio being a ratio of an average visible diffusive reflectance to an average visible total reflectance,
wherein the plurality of particles have an imaginary refractive index less than 10.

Item 20. The article of item 19, wherein the wavelength selective scattering layer has a near-infrared scattering ratio of less than about 0.6.

Item 21. The article of item 19, wherein the wavelength selective scattering layer has a near-infrared scattering ratio of less than about 0.4.

Item 22. The article of any one of items 19 to 21, wherein the wavelength selective scattering layer has a visible reflective haze ratio of greater than about 0.3.

Item 23. The article of any one of items 19 to 21, wherein the wavelength selective scattering layer has a visible reflective haze ratio of greater than about 0.5.

Item 24. The article of any one of items 19 to 21, wherein the plurality of particles have an imaginary refractive index is less than $10^{-7}$.

Item 25. The article of any one of items 19 to 21, wherein the plurality of particles have an imaginary refractive index between 10 and $10^{-1}$.

Item 26. The article of any one of items 19 to 21, wherein the plurality of particles include $TiO_2$, inorganic pigments, or organic pigments.

Item 27. The article of any one of items 19 to 26, wherein the wavelength selective scattering layer comprises an optical medium including a polymer, a coated polymer, a thermoplastic polymer, or an adhesive.

Item 28. The article of any one of items 19 to 27, wherein the scattering layer comprises a printable ink.

Item 29. The article of any one of items 19 to 27, wherein the scattering layer comprises dye.

Item 30. The article of any one of items 19 to 29, wherein the optical filter comprises a protective layer.

Item 31. The article of any one of items 19 to 29, wherein the optical filter comprises a sealant layer.

Item 32. The article of any one of items 19 to 29, wherein the wavelength selective scattering layer has an average near-infrared transmission scattering of less than about 0.5 with a near-infrared range from 800 nm to 1000 nm.

Item 33. The article of any one of items 19 to 29, wherein the wavelength selective scattering layer has an average near-infrared transmission scattering of less than about 0.2 with a near-infrared range from 800 nm to 1000 nm.

Item 34. The article of any one of items 19 to 29, wherein the wavelength selective scattering layer has an average near-infrared transmission scattering of less than about 0.1 with a near-infrared range from 800 nm to 1000 nm.

Item 35. The article of any one of items 19 to 29, wherein the wavelength selective scattering layer has an average near-infrared transmission scattering of less than about 0.05 with a near-infrared range from 800 nm to 1000 nm.

Item 36. The article of any one of items 19 to 29, wherein the wavelength selective scattering layer has an average near-infrared transmission scattering of less than about 0.02 with a near-infrared range from 800 nm to 1000 nm.

Item 37. The article of item 19, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.9 line] of FIG. 5.

Item 38. The article of item 19, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.6 line] of FIG. 5.

Item 39. The article of item 19, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.4 line] of FIG. 5.

Item 40. The article of item 24, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.9 line] of FIG. 6.

Item 41. The article of item 24, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.6 line] of FIG. 6.

Item 42. The article of item 24, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.4 line] of FIG. 6.

Item 43. The article of item 25, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.9 line] of FIG. 9.

Item 44. The article of item 25, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.6 line] of FIG. 9.

Item 45. The article of item 25, wherein the wavelength selective scattering layer comprises an optical medium have a first refractive index, wherein the plurality of particles has a second refractive index, wherein an average particle size of the plurality of particles, the first refractive index, and the second refractive index are selected from a region under line [0.4 line] of FIG. 9.

Various examples of the invention have been described. These and other examples are within the scope of the following claims.

The invention claimed is:

1. A system comprising:
one or both of a light emitter or a light receiver; and
an optical filter adjacent one or both of the light emitter or the light receiver,
wherein the optical filter comprises a wavelength selective scattering layer,
wherein the wavelength selective scattering layer comprises a plurality of particles,
wherein the wavelength selective scattering layer has a near-infrared scattering ratio of less than about 0.9, the near-infrared scattering ratio being a ratio of an average near-infrared scattering to an average visible haze,
wherein the wavelength selective scattering layer has a visible reflective haze ratio of greater than about 0.1, the visible reflective haze ratio being a ratio of an average visible diffusive reflectance to an average visible total reflectance, and
wherein the plurality of particles have an imaginary refractive index less than 10.

2. The system of claim 1, wherein the plurality of particles have an imaginary refractive index between 10 and $10^{-1}$.

3. The system of claim 1, wherein the plurality of particles include $TiO_2$, inorganic pigments, or organic pigments.

4. The system of claim 1, wherein the wavelength selective scattering layer comprises a printable ink.

5. The system of claim 1, wherein the wavelength selective scattering layer comprises dye.

6. An article comprising:
An optical filter,
wherein the optical filter comprises a wavelength selective scattering layer,
wherein the wavelength selective scattering layer comprises a plurality of particles,
wherein the wavelength selective scattering layer has a near-infrared scattering ratio of less than about 0.9, the near-infrared scattering ratio being a ratio of an average near-infrared scattering to an average visible haze, wherein the wavelength selective scattering layer has a visible reflective haze ratio of greater than about 0.1, the visible reflective haze ratio being a ratio of an average visible diffusive reflectance to an average visible total reflectance, wherein the plurality of particles have an imaginary refractive index less than 10.

7. The article of claim 6, wherein the plurality of particles have an imaginary refractive index between 10 and $10^{-1}$.

8. The article of claim 6, wherein the plurality of particles include $TiO_2$, inorganic pigments, or organic pigments.

9. The article of claim 6, wherein the scattering layer comprises a printable ink.

10. The article of claim 6, wherein the scattering layer comprises dye.

* * * * *